(12) United States Patent
To

(10) Patent No.: US 8,725,685 B2
(45) Date of Patent: May 13, 2014

(54) CONTENT TRANSFER APPARATUS AND ASSOCIATED METHODOLOGY OF UPDATING CONTENTS BETWEEN DEVICES

(75) Inventor: Yuichiro To, Tokyo (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 10/589,638

(22) PCT Filed: Jan. 27, 2005

(86) PCT No.: PCT/JP2005/001146
§ 371 (c)(1),
(2), (4) Date: Aug. 16, 2006

(87) PCT Pub. No.: WO2005/081111
PCT Pub. Date: Sep. 1, 2005

(65) Prior Publication Data
US 2008/0222126 A1    Sep. 11, 2008

(30) Foreign Application Priority Data
Feb. 25, 2004  (JP) .................................. 2004-049617

(51) Int. Cl.
*G06F 17/30*  (2006.01)

(52) U.S. Cl.
USPC ......................................... 707/621; 707/625

(58) Field of Classification Search
USPC ................................................ 707/621, 625
See application file for complete search history.

(56) References Cited

U.S. PATENT DOCUMENTS

| | | | | |
|---|---|---|---|---|
| 5,446,888 A | * | 8/1995 | Pyne ................................ | 707/10 |
| 5,649,200 A | * | 7/1997 | Leblang et al. ............... | 717/122 |
| 6,816,891 B1 | * | 11/2004 | Vahalia et al. ........ | 707/E17.007 |
| 6,928,433 B2 | * | 8/2005 | Goodman et al. ................ | 707/4 |
| 7,113,454 B2 | * | 9/2006 | Matsuoka .................. | 369/30.04 |

(Continued)

FOREIGN PATENT DOCUMENTS

| | | |
|---|---|---|
| JP | 08-115278 | 5/1996 |
| JP | 8-179980 | 7/1996 |

(Continued)

OTHER PUBLICATIONS

Stauffer. "How to do Everything with iTunes for Macintosh and Windows: covers iTunes 4.2", Feb. 2004, McGraw-Hill, p. 1-263.*

(Continued)

*Primary Examiner* — Khanh Pham
(74) *Attorney, Agent, or Firm* — Oblon, Spivak, McClelland, Maier & Neustadt, L.L.P.

(57) ABSTRACT

An information-processing apparatus includes a networking device that communicates with an external apparatus. The information-processing apparatus also includes a storage that stores an album of a plurality of content data and a transfer log indicating whether each of the content data has been transferred to the external apparatus. The information-processing apparatus additionally includes a processing unit that identifies certain content data from the content data of the album when the transfer log indicates that the certain content data has never been transferred to the external apparatus and controls a display of information about the album. Further, the processing unit starts a transfer of the certain content data to the external apparatus, when the album has been selected and the certain content data has never been transferred to the external apparatus, and updates the transfer log when the networking device transfers the certain content data to the external apparatus.

10 Claims, 13 Drawing Sheets

(56) References Cited

U.S. PATENT DOCUMENTS

| | | | |
|---|---|---|---|
| RE39,458 E * | 1/2007 | Pyne | 707/201 |
| 7,166,791 B2 * | 1/2007 | Robbin et al. | 84/477 R |
| 7,191,193 B2 * | 3/2007 | Ben-Yaacov et al. | 707/104.1 |
| 2001/0016853 A1 * | 8/2001 | Kucala | 707/204 |
| 2001/0030827 A1 * | 10/2001 | Morohashi | 360/69 |
| 2002/0087658 A1 * | 7/2002 | Hayashi et al. | 709/217 |
| 2003/0079038 A1 * | 4/2003 | Robbin et al. | 709/232 |
| 2003/0097379 A1 | 5/2003 | Ireton | |
| 2003/0105847 A1 * | 6/2003 | Jennery et al. | 709/223 |
| 2003/0126558 A1 * | 7/2003 | Griffin | 715/513 |
| 2003/0144918 A1 | 7/2003 | Novelli et al. | |
| 2003/0182308 A1 * | 9/2003 | Ernst et al. | 707/103 Z |
| 2003/0182471 A1 * | 9/2003 | Harris et al. | 709/328 |
| 2004/0223245 A1 * | 11/2004 | Morohashi | 360/15 |
| 2007/0155306 A1 * | 7/2007 | Koli et al. | 455/3.01 |
| 2007/0162753 A1 * | 7/2007 | Nakano et al. | 713/171 |

FOREIGN PATENT DOCUMENTS

| | | |
|---|---|---|
| JP | 2000-124942 | 4/2000 |
| JP | 2001-350727 | 12/2001 |
| JP | 2002 23772 | 1/2002 |
| JP | 2002-366486 | 12/2002 |
| JP | 2003 67208 | 3/2003 |
| JP | 2003-122679 | 4/2003 |
| JP | 2003-216430 | 7/2003 |
| JP | 2003-279113 | 10/2003 |
| JP | 2003-348515 | 12/2003 |
| WO | 03 036541 | 5/2003 |

OTHER PUBLICATIONS

Biersdorfer, "Ipod and iTunes the Missing Manual", Feb. 2004, 2nd Ed., Safari Online Books, p. 1-44.*

Rangan et al, "Designing File Systems for Digital Video and Audio", ACM SOSIP'91, p. 81-94.*

Sarvas et al, "MobShare: Controlled and Immediate Sharing of Mobile Images", Oct. 2004, MM'04, ACM Press, p. 724-731.*

Jaimes et al, "Duplicate Detection in Consumer Photography and News Video", Dec. 2002, MM'02, ACM Press, p. 423-424.*

Carol et al, "User Guide Laplink: The Standard in Remote Control and File Transfer, Version Gold 11.0", Sep. 2001, Laplink Inc., 160 pages.*

Carol et al, "Laplink Version 11", Sep. 2001, Laplink Inc., p. 2-160, <Retrieved from Examiner files Apr. 11, 2009>.*

Tsuchiya et al., "Windows 95, Official Manual Shohan", ASCII Corp, vol. 1, pp. 361-370, 1996.

Apple-iTunes-Syncwith iPod., [online], Apple Computer, Inc., 2004. [retrieved on Apr. 26, 2005]., Retrieved from the Internet: <URL:http://web.aechive.org/web/20040208172610/http://www.apple.com/itunes/sync.html.>.

Microsoft Corp, "Windows Media Player 9 Series", Windows Media Player, Version 9, Jun. 7, 2003, pp. 1-33, 70-77, 89-90 and 158-159.

* cited by examiner

FIG. 3A

| ID | SONG NAME | SONG FILE NAME |
|---|---|---|
| 1 | SONG-A | C:¥Root¥Song-A¥track.omg |
| 2 | SONG-B | C:¥Root¥Song-B¥track.omg |
| 3 | SONG-C | C:¥Root¥Song-B¥track.omg |

FIG. 3B

| ID | ALBUM NAME | ID'S OF SONGS IN THE ALBUM |
|---|---|---|
| 100 | ALBUM-A | 1,2,5,... |
| 101 | ALBUM-B | 1,3,4,... |

FIG. 9

| NAME OF EXTERNALLY CONNECTED DEVICE | MEDIA D | TRANSFERRED SONG LOG INFORMATION (LIST OF ID'S OF TANSFERRED SONGS) |
|---|---|---|
| ATRAC HDD | 0101A3460201 22····123562 | 1, 2, 5, 7, 9, 11, 12, 14, 16, 21, 22 ··· ···,<br>···22, 24, 25, 2, 8, 31, 33, 34, 35 |

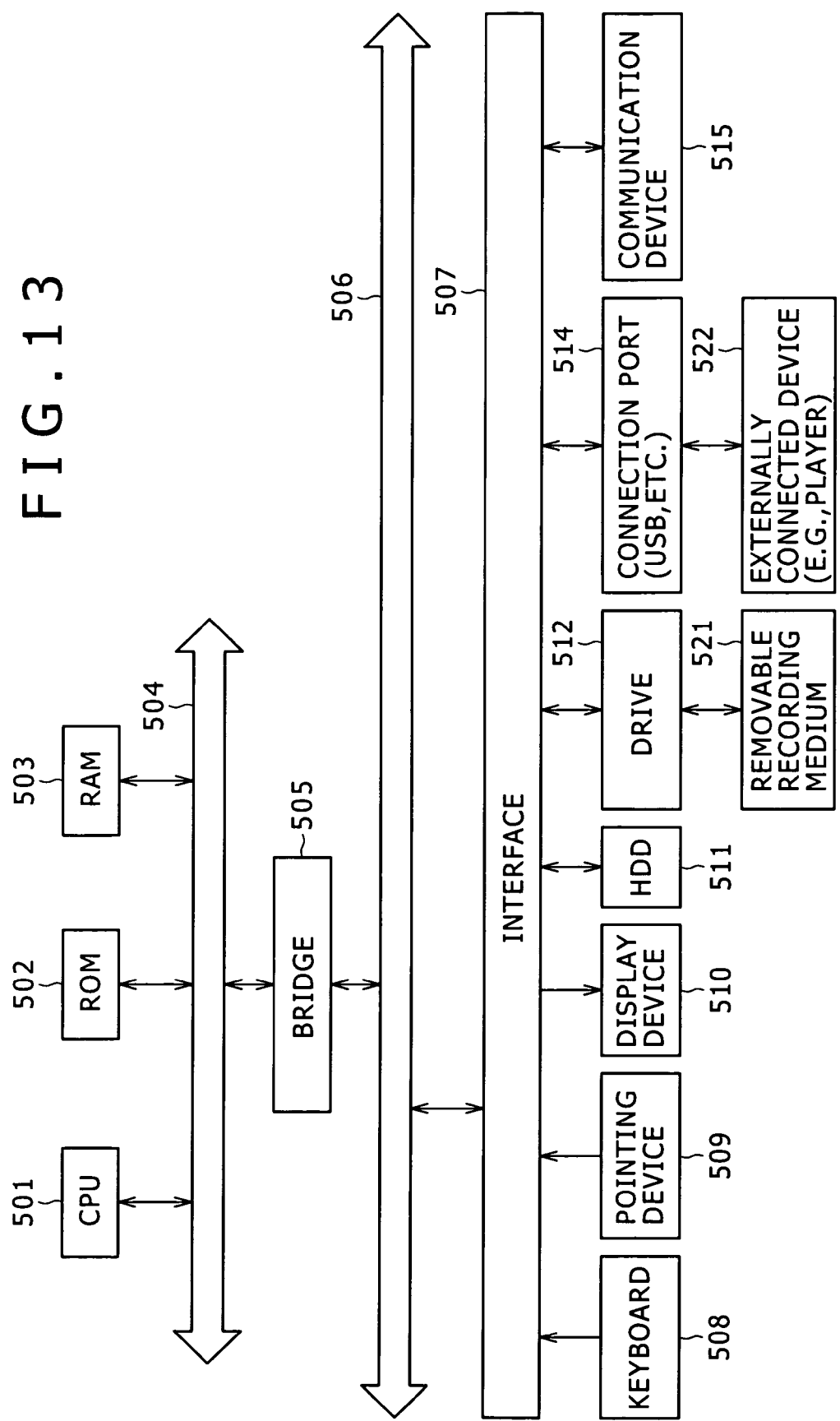

CONTENT TRANSFER APPARATUS AND ASSOCIATED METHODOLOGY OF UPDATING CONTENTS BETWEEN DEVICES

TECHNICAL FIELD

The present invention relates to an information processing apparatus, an information processing method, and a computer program. More particularly, the invention relates to an information processing apparatus, an information processing method, and a computer program for use with a setup constituted by a storage section such as a hard disk accommodating music contents and by a portable device (PD) or external media, the inventive apparatus, method and program serving to carry out a transfer process whereby the contents yet to be transferred from the storage section to the portable device or to the external media are automatically determined and established as the contents to be transferred.

BACKGROUND ART

Today, information processing apparatuses such as PCs and portable devices with mass storage capabilities including large-capacity hard disk or DVD drives have come into general use. A large number of content users place huge quantities of contents such as music data and image data into appropriate storing means for storage and management purposes. These kinds of data are compressed using the MP3, ATRAC or other suitable standard before being stored as digital data. The data may be encrypted as needed for management.

Recently popularized forms of content use typically involve having desired music contents downloaded from music distribution servers such as EMD (Electronic Music Distribution) servers onto recording media in each user's PC. The downloaded contents may be output (i.e., checked out) from the PC as needed to the user's portable device (PD) for content reproduction.

There exist so-called jukebox applications for managing and reproducing music contents as well as for controlling their transfer to external devices such as the portable device (PD). The representative jukebox applications include SonicStage (trademark), SonicStage Simple Burner (trademark), MGIQLIP (trademark), Windows Media Player (trademark), Real Player (trademark), and iTunes (trademark). Each application has the ability to download EMD contents and to transfer song data from the hard disk (HD) in the PC to the connected device or media.

Before any song data stored on the hard disk (HD) in the PC can be transferred to the portable device (PD) or other suitable equipment or media connected to the PC, it is necessary to select songs constituting the contents to be transferred.

In recent years, the hard disk drives used typically as the data storing means for the PC and other equipment have gained huge storage capacities. The similar trend toward greater recording capabilities has also been observed with the storing means for portable devices (PD). With such mass storage media in general use, it has become almost common practice today to transfer contents not on a song by song basis but as a large group of selected songs between devices or between equipment and media.

Where such multiple songs are to be transferred illustratively to the portable device (PD) connected as a destination for the transfer, it is preferable to check whether any of the songs have already been transferred so that the duplicate transfer of songs may be avoided. That check, however, can take up a considerable part of the transfer process especially when there is a large number of contents to be checked at the source or at the destination of the transfer.

For example, when any one of the above-mentioned applications is used to transfer contents, the GUI (Graphic User Interface) of the application usually offers the ability to display a list of transferable songs. However, it is generally up to the user to verify whether the numerous songs included in the displayed list have already been transferred, one song at a time.

Apple Computer's iTunes, one of the jukebox applications, has a function called "Auto Sync" that works with ipod, a portable device marketed by the same company. This function involves comparing song data in the content database of the PC (i.e., on the hard disk), which may be supplemented from time to time by new songs from downloaded EMD contents or ripped CDs, with the song data in the connected portable device (i.e., ipod). Following the comparison, any song data that is found on the hard disk of the PC but not in ipod is transferred from the PC to iPod so that the song data on both sides will be synchronized. Descriptions of ipod and the Auto Sync function are found at a non-patent documents 1 and 2.

Using that function makes it possible to transfer automatically the song data from the hard disk of the PC to ipod. However, the function can only work with devices such as iPod which have a storage capacity large enough to accommodate all songs held on the hard disk of the PC. When song data is to be transferred by this function, the quantity of the data to be transferred from the hard disk of the PC must not exceed the capacity of the media that will accommodate the transferred data.

If the amount of the data to be transferred from the hard disk of the PC exceeds the capacity of the destination media, then not all target data to be transferred can be accommodated by the media. In the end, the user is required to select manually the contents to be transferred.

[Non-Patent Document 1]
http://www.apple.co.jp/ipod/
[Non-Patent Document 2]
http://www.apple.co.jp/ipod/autosync.html

DISCLOSURE OF INVENTION

The present invention has been made in view of the above circumstances and provides an information processing apparatus, an information processing method, and a computer program for use with a setup included by the information processing apparatus such as a PC that stores and manages contents including music data and by a portable device (PD) or external media, the inventive apparatus, method and program serving to carry out a transfer process whereby the contents yet to be transferred from the apparatus to the portable device or to the external media are automatically determined and established as the contents to be transferred.

In carrying out the present invention and according to a first embodiment thereof, there is provided an information processing apparatus including: a data storage block which store contents; and a data processing block which transfers the contents to an external device; wherein the data processing block acquires recorded data including content IDs about the contents already transferred from the information processing apparatus to the external device connected to the apparatus, the data processing block further comparing the acquired recorded data about the transferred contents with the content IDs of the contents stored in the data storage block in order to determine non-transferred contents which are established as the contents to be transferred to the external device.

Preferably, the data processing block may acquire information about albums including the non-transferred contents so that the contents held in the albums identified by the acquired information may be established as the contents to be transferred to the external device.

The data processing block may preferably cause displaying means to display information about albums including the non-transferred contents and, given a selection of albums from a user in response to the displayed information, may transfer the contents from the selected albums.

The data processing block may preferably acquire information about albums having only the non-transferred contents so that the contents held in the albums identified by the acquired information may be established as the contents to be transferred to the external device.

The data processing block may preferably cause displaying means to display information about albums having only the non-transferred contents and, given a selection of albums from a user in response to the displayed information, may transfer the contents from the selected albums.

The data processing block may preferably acquire recorded data about the transferred contents from the external device, and compare the acquired recorded data about the transferred contents with the content IDs of the contents stored in the data storage block in order to determine non-transferred contents.

The data processing block may preferably store the recorded data about the transferred contents into a memory of the information processing apparatus and, based on external device identification information acquired from the external device, may extract recorded data entries about the transferred contents corresponding to the external device from the recorded data about the transferred contents stored in the memory, the data processing block further comparing the extracted recorded data about the transferred contents with the content IDs of the contents stored in the data storage block in order to determine non-transferred contents.

According to a second embodiment of the present invention, there is provided an information processing method for transferring contents to an external device, the information processing method including the steps of: detecting the external device upon connection thereof; acquiring recorded data including content IDs about the contents already transferred from an information processing apparatus to the external device; comparing the recorded data about the transferred contents with the content IDs of the contents stored in a data storage block of the information processing apparatus in order to determine non-transferred contents; and establishing the non-transferred contents thus determined as the contents to be transferred to the external device, before transferring the non-transferred contents.

Preferably, the information processing method according to the present invention may further include the step of acquiring information about albums including the non-transferred contents so that the contents held in the albums identified by the acquired information may be established as the contents to be transferred to the external device.

Preferably, the information processing method according to the invention may further include the steps of: causing displaying means to display information about albums including the non-transferred contents; and given a selection of albums from a user in response to the displayed information, transferring the contents from the selected albums.

Preferably, the information processing method according to the invention may further include the step of acquiring information about albums having only the non-transferred contents so that the contents held in the albums identified by the acquired information may be established as the contents to be transferred to the external device.

Preferably, the information processing method according to the invention may further include the steps of: causing displaying means to display information about albums having only the non-transferred contents; and given a selection of albums from a user in response to the displayed information, transferring the contents from the selected albums.

Preferably, the information processing method according to the invention may further include the step of acquiring recorded data about the transferred contents from the external device, before comparing the acquired recorded data about the transferred contents with the content IDs of the contents stored in the data storage block in order to determine non-transferred contents.

Preferably, the information processing method according to the invention may further include the steps of: acquiring external device identification information from the external device; and based on the acquired external device identification information, extracting recorded data entries about the transferred contents corresponding to the external device from the recorded data about the transferred contents stored in a memory of the information processing apparatus, before comparing the extracted recorded data about the transferred contents with the content IDs of the contents stored in the data storage block in order to determine non-transferred contents.

According to a third embodiment of the present invention, there is provided a computer program for carrying out a procedure for transferring contents to an external device, the procedure including the steps of: detecting the external device upon connection thereof; acquiring recorded data including content IDs about the contents already transferred from an information processing apparatus to the external device; comparing the recorded data about the transferred contents with the content IDs of the contents stored in a data storage block of the information processing apparatus in order to determine non-transferred contents; and establishing the non-transferred contents thus determined as the contents to be transferred to the external device, before transferring the non-transferred contents.

The computer program according to the present invention is offered in an appropriate computer-readable format on suitable media for use with a computer system capable of executing diverse program codes, the media including such recording media as CDs, FDs and MOs, as well as communication media such as networks. When supplied with the medium carrying the program in a computer-readable format, the computer system implements the processes representative of what is coded in the program.

Other objects, features and advantages of the invention will become more apparent upon a reading of the following description and appended drawings. In this specification, the term "system" refers to a logical configuration of a plurality of component devices. Each of the devices may or may not be housed in a single enclosure.

According to the present invention, when the contents stored in and managed by an information processing apparatus are to be transferred to an external device, a check-out log is acquired from the external device as recorded data including content IDs about the contents already transferred to the device. The content IDs in the check-out log are compared with the content IDs acquired from a song management information storage section in the information processing apparatus with regard to the contents stored in the apparatus, whereby non-transferred contents are selected and transferred to the external device. The inventive apparatus and method eliminate the need for the user to check already transferred contents in order to select the contents to be transferred, thus making the transfer of contents more efficient than before.

Also according to the present invention, even when an automatic transfer setting is in place, the user is still presented through GUI with either a list of albums including non-transferred songs or a list of albums having only non-transferred songs so that the user may select desired albums from which to transfer the songs. The benefit of this feature is twofold: the user's chores are reduced by the automatic selection and transfer of non-transferred songs, and the user's preferences are taken into account in transferring the contents.

BRIEF DESCRIPTION OF DRAWINGS

FIGS. 3A and 3B are tabular views listing song management information and album management information managed by the information processing apparatus of the invention.

FIG. 9 is a tabular view showing data in a check-out log acquired from the external device by the information processing apparatus of the invention.

FIG. 13 is a block diagram showing a hardware structure of the information processing apparatus of the invention.

BEST MODE FOR CARRYING OUT THE INVENTION

Figure 1:
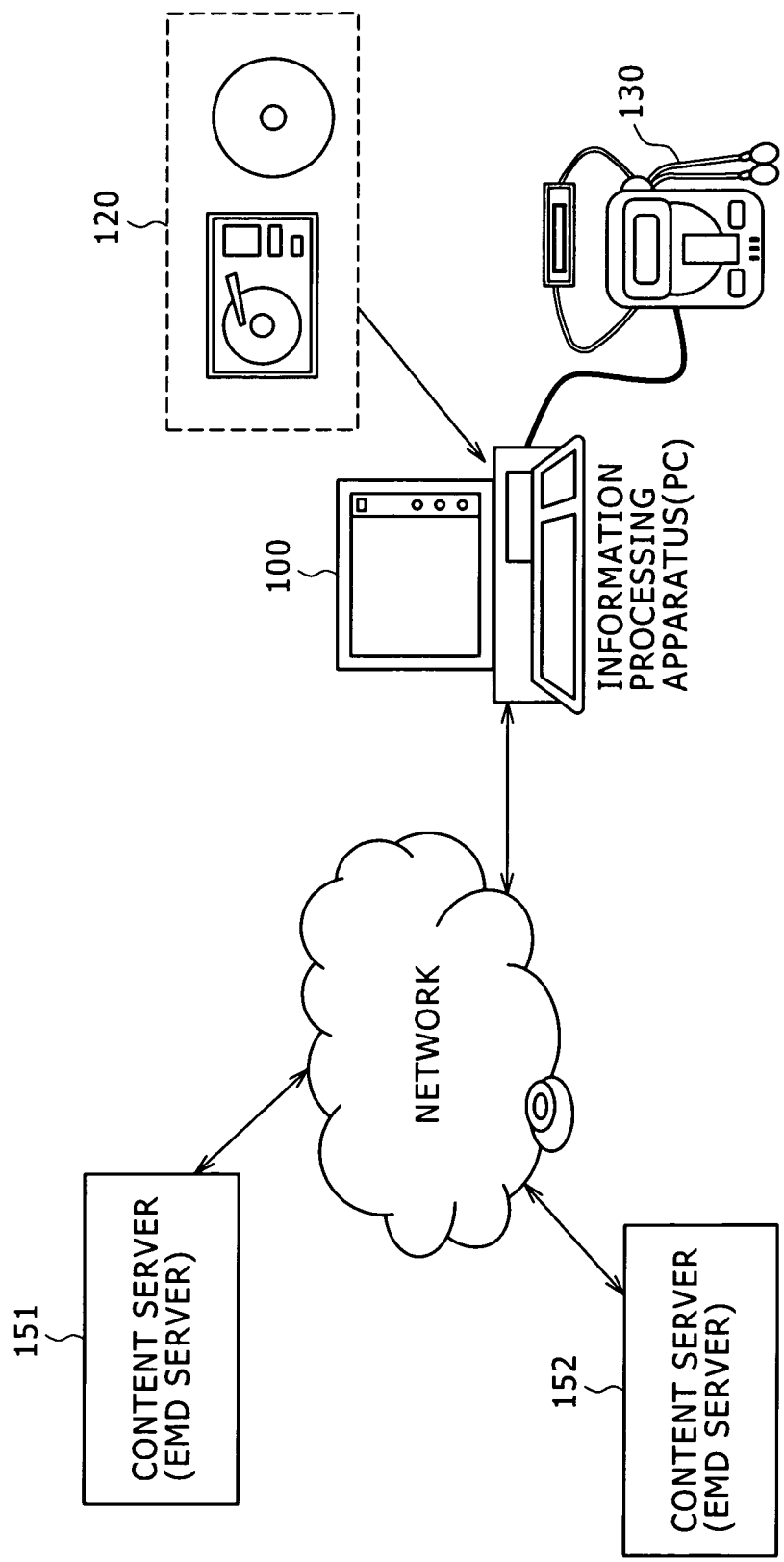
FIG. 1 is a schematic view showing how an information processing apparatus practiced as an embodiment of the present invention carries out a content data transfer process.

FIG. 1 is a schematic view showing how an information processing apparatus embodying the present invention is typically configured. The inventive information processing apparatus includes storing means such as a hard disk drive that accommodates contents. The stored contents are transferred from the apparatus to an external device such as a portable device (PD) or to media such as a flash memory.

The information processing apparatus 100 is illustratively formed by a personal computer that has a data storage block 120 retaining music data and management information. The information processing apparatus 100 is connected to a network such as a local area network or the Internet. In operation, the information process apparatus 100 is capable of having contents downloaded over the network to which it is connected.

The information processing apparatus 100 records to the data storage block 120 the music contents downloaded from content servers 151 and 152 such as EMD (Electronic Music Distribution) servers connected to the network or the music contents read from information recording media such as CDs (Compact Discs). These kinds of data are recorded after being coded using the MP3, ATRAC3 or other suitable standard or after being encrypted as needed.

In response to requests from the information processing apparatus 100, the content servers 151 and 152 send the following to the apparatus 100: music data constituting contents; attribute information about the contents such as album names, artist names, names of the songs in the albums, and playing time information; license information about the use of the contents; and additional information such as jacket images and lyrics. The information processing apparatus 100 stores the contents downloaded from the servers into the data storage block 120 together with the attribute information such as album names, artist names, and playing time information, license information about the use of the contents, and additional information corresponding to the downloaded contents.

The license information about a given content includes illustratively a check-out count, i.e., a maximum number of portable devices (PD) allowed to use concurrently the content in question, as well as information specifying whether the content is authorized to be copied. In the description that follows, the portable devices refer generically to players that reproduce contents, to media such as flash memories, to storage blocks capable of accommodating contents, and to any device with a control unit that can control data transfer processes.

Illustratively, the information processing apparatus 100 can output (i.e., check out) contents to a portable device 130 via a USB cable together with management information and license information about the contents in question. The check-out process is carried out under a management scheme based on the license information about the contents involved.

Figure 2:
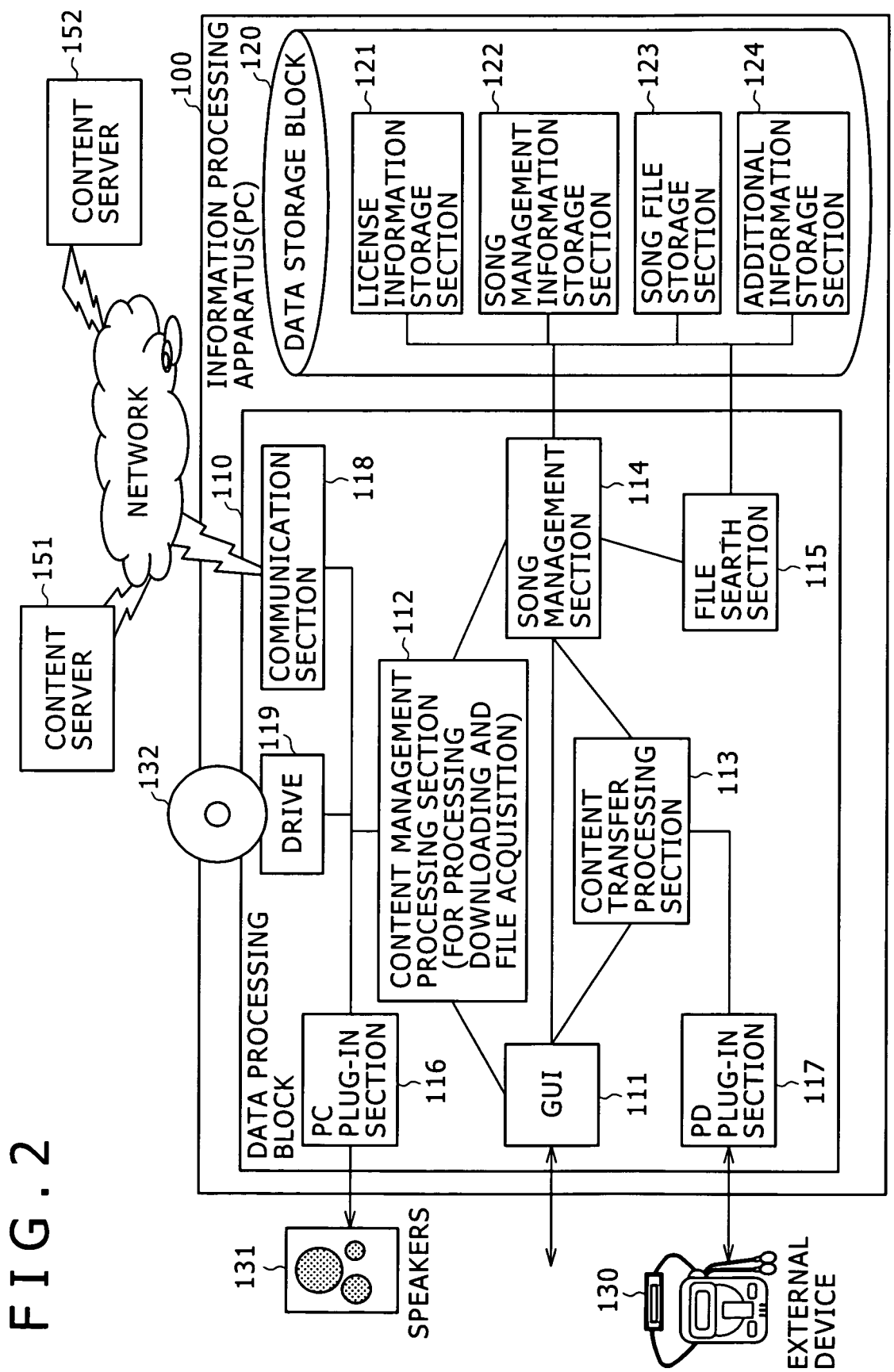
FIG. 2 is an explanatory view showing processing functions of the information processing apparatus according to the invention.

The processing functions of the information processing apparatus according to the invention will now be explained with reference to FIG. 2. The information processing apparatus 100 has a data processing block 110 and the data storage block 120. The data processing block 110 includes a GUI section 111, a content management processing section 112, a content transfer processing section 113, a song management section 114, a file search section 115, a PC plug-in section 116, a PD plug-in section 117, a communication section 118, and a drive 119. The data storage block 120 includes a license information storage section 121, a song management information storage section 122, a song file storage section 123, and an additional information storage section 124. Each storage section accommodates corresponding information.

The data processing block 110 is constituted by a CPU that processes data in keeping with computer programs and by a RAM, a ROM and other storage locations for retaining programs and parameters. A specific hardware structure of the data processing block 110 will be described later. Details of the blocks shown in FIG. 2 are explained below.

The GUI (Graphical User Interface) section 111 generates diverse data input/output screens and presents them on a display screen. The role of the GUI section 111 is twofold: it functions as a data input section that responds to the user's operations on a keyboard and a mouse, and it also functions as a data output section that displays various kinds of information such as content information, content reproduction status information, content download information, and content transfer status information.

When contents are to be transferred to the external device 130, the GUI section 111 displays a list of songs yet to be transferred to the device 130.

During the process of transferring contents to the external device 130, the song management section 114 acquires through the PD plug-in section 117 and content transfer processing section 113 check-out log information, i.e., recorded data about the contents transferred to and retained by the external device 130. Preferably, check-out logs may be kept in a memory managed by the song management section 114 in conjunction with external device IDs. From the check-out logs in the memory of the information processing apparatus, each external device may acquire only its external device ID in order to extract the check-out log entries with regard to the connected device.

More specifically, a check-out log indicating the content IDs (i.e., song IDs) of transferred contents is acquired from the external device 130. Alternatively, in accordance with the device ID acquired from the external device, the entries of the check-out log corresponding to the connected device are extracted from the check-out logs held in the memory of the information processing apparatus. The check-out log thus acquired or extracted is compared with management information kept in the song management information storage section 122.

The song management section 114 compares the content IDs (song IDs) of the contents (i.e., song data) placed in the data storage section 120 with the check-out log. Through the comparison, the song management section 114 extracts the content IDs (song IDs) of the contents not included in the check-out log (i.e., non-transferred songs), selects the albums that include the extracted non-transferred songs, and presents the user with information about these albums by way of the GUI section 111. Given the album information, the user may select desired contents to be transferred. The steps involved in this process will be described later in more detail.

The content management processing section 112 connects to the content servers 151 and 152 via the network on the basis of content designation information (e.g., URLs) input from the GUI section 111, and proceeds to acquire the designated contents. The acquired contents are forwarded through the song management section 114 to the song file storage section 123 of the data storage block 120 for storage. These steps constitute a content downloading process.

The data constituting the contents proper are acquired together with attribute information about the contents in question such as song names, album names and artist names. These items of information are stored into the song management information storage section 122. License information serving as content access right information is also acquired as needed and stored into the license information storage section 121. Jacket images and lyrics applicable to the contents are placed into the additional information storage section 124.

The major functions of the content management processing section 112 deal with downloading of contents, acquisition of downloaded contents, and control over content reproduction.

The content management processing section 112 also downloads designated contents from the content servers 151 and 152 through the communication section 118 in accordance with user-specified content designation information such as URL information. Furthermore, the content management processing section 112 inputs contents from an information recording medium 132 loaded in the drive 119. The contents thus downloaded or input are sent through the song management section 114 to the file storage section 122 in the data storage block 120 for storage.

The content management processing section 112 also controls content reproduction. Given a reproduction request through the GUI section 111, the content management processing section 112 outputs applicable content IDs as content designation information to the song management section 114. The song management section 114 acquires the file names corresponding to the content IDs, and supplies the content management processing section 112 with the song files (content files) acquired by the file search section 115 through file searches. The content management processing section 112 then controls reproduction of the acquired content files. With reproduction thus controlled, the contents are reproduced on the basis of their license information.

The song management section 114 acquires from the data storage section 120 diverse kinds of data such as song management information, song files, license information, and additional information including jacket images and lyrics illustratively in response to the user's input via the GUI section 111. If the user makes a request through the GUI section 111 for acquisition of song information, the song management section 114 acquires corresponding content information such as content IDs, album names, song names, and artist names from the song management information storage section 122 in the data storage block 120. The acquired content information is sent to the GUI section 111 which in turn displays the received information on the display screen.

The user may select particular contents from the content information appearing on the display screen and input a request to reproduce the selected contents. In that case, the GUI section 111 supplies the content management processing section 112 with the song IDs corresponding to the contents requested to be reproduced. Reproduction of the contents is executed through the PC plug-in section 116.

Upon content reproduction, the song management section 114 acquires from the song management information storage section 122 the file names corresponding to the song IDs, and causes the file search section 115 to search through the song file storage section 123 for the content files based on the acquired file names. The song management section 114 outputs the song files thus acquired to the content management processing section 112. In turn, the content management processing section 112 forwards the acquired contents through the PC (Protected Content) plug-in section 116 to an external output device (e.g., speakers 131).

During the process of content reproduction, the contents are decoded or decrypted if they were coded or encrypted earlier. Content reproduction takes place following the decoding or decryption.

The user may input through the GUI section 111 a content output (i.e., check-out) or input (i.e., check-in) request in order to output or input desired contents to or from the external device 130 such as a portable device (PD). In such a case, the GUI section 111 supplies the content transfer processing section 113 with the song IDs corresponding to the contents requested to be transferred. Transfer of the contents is executed via the PD plug-in section 117.

Upon receipt of the song IDs from the GUI section 111 requesting the transfer of the corresponding contents, the content transfer processing section 113 forwards the received song IDs to the song management section 114. The song management section 114 acquires from the song management information storage section 122 the file names corresponding to the song IDs, and causes the file search section 115 to search through the song file storage section 123 for the content files based on the acquired file names. The song management section 114 outputs the acquired song files to the content transfer processing section 113. In turn, the content transfer processing section 113 supplies the acquired contents to the PD plug-in section 117. The PD plug-in section 117 and the external device 130 such as the portable device authenticate one another before the PD plug-in section 117 transfers the contents to the external device 130. Transfer of the contents takes place only if the mutual authentication is successfully concluded.

In response to processing requests from the GUI section 111, content management processing section 112, or content transfer processing section 113, the song management section 114 acquires or deletes data to or from the data storage block 120 or updates data held in that block 120.

Illustratively, in accordance with the song IDs designated by the content management processing section 112 or by the content transfer processing section 113, the song management section 114 acquires the content file names corresponding to the song IDs from the content management information held in the song management information storage section 122. Based on the acquired file names, the song management section 114 outputs song file search instructions to the file search section 115 causing that section 115 to acquire the corresponding song files from the song file storage section 123. The song management section 114 sends the acquired song files to the content management processing section 112 or to the content transfer processing section 113.

Furthermore, the song management section 114 inputs to the data storage section 120 the contents downloaded by the content management processing section 112 from external servers as well as the contents retrieved from the information recording media such as CDs.

In the data storing process, the song management section 114 generates content files in the data format of MP3, OMG, WMA or the like and stores the generated content files into the song file storage section 123. In addition to the data constituting the contents proper, the song management section 114 stores attribute information about the contents in question such as song names, album names and artist names into the song management information storage section 122. The song management section 114 also stores license information serving as content access right information into the license information storage section 121 and additional information such as jacket images and lyrics into the additional information storage section 124.

On the basis of the user's processing request that is input through the GUI section 111, the song management section 114 records, updates, or deletes data to or from the song management information storage section 122 of the data storage block 120, the data constituting content information such as album names, song names, artist names, and content file names about contents. The song management section 114 also reads the content information from the song management information storage section 122.

Given data search requests from the GUI section 111, the song management section 114 searches the song management information storage section 122 for the requested data. Following the search, the song management section 114 retrieves content attribute information such as album names, artist names, song names, and song IDs from the song management information storage section 122 and sends the retrieved information to the GUI section 111.

When contents are to be transferred to the external device 130, the song management section 114 acquires a check-out log from the device 130 via the PD plug-in section 117 and content transfer processing section 113. The check-out log includes the content IDs (i.e., song IDs) of the contents already transferred to and currently retained by the device 130 as described above. The song management section 114 then compares the acquired check-out log with management information stored in the song management information storage section 122.

By comparing the content IDs (song IDs) held in the data storage block 120 with the check-out log, the song management section 114 extracts the content IDs (song IDs) of the songs not included in the check-out log (i.e., non-transferred contents). The song management section 114 then selects the albums including the extracted non-transferred contents and presents the user with information about the selected albums through the GUI section 111. Given the album information, the user selects desired contents to be transferred. These steps will be described later in more detail.

Upon request from the song management section 114, the file search section 115 searches the song file storage section 123 for the content storage files corresponding to the file names acquired from the song management information storage section 122 of the data storage block 120. The file search section 115 supplies the song management section 114 with the files retrieved from the song file storage section 123.

Given the content storage files from the file search section 115, the song management section 114 forwards the files to the content management processing section 112 or to the content transfer processing section 113.

The data storage block 120 contains the license information storage section 121, song management information storage section 122, song file storage section 123, and additional information storage section 124.

The song management information stored in the song management information storage section 122 will now be described with reference to FIGS. 3A and 3B. The song management information storage section 122 accommodates management information about the song files held in the song file storage section 123.

FIGS. 3A and 3B show data structures of the song management information in the song management information storage section 122. As illustrated, the song management information placed in the song management information storage section 122 has two kinds of management data: one in increments of songs, and another in increments of albums.

FIG. 3A indicates management data collected on a song by song basis. FIG. 3B depicts management data arranged in units of albums, each album constituting a collection of songs.

The song-by-song management data shown in FIG. 3A includes data that corresponds to the song IDs identifying stored songs, to song names, and to song file names. These are all items of management information about the song files stored in the song file storage section 123. The song IDs are unique to the song files that are stored in the song file storage section 123.

The album-by-album management data shown in FIG. 3B includes data that corresponds to the album IDs identifying stored albums, to album names, and to the song IDs of the songs contained in the albums. These are all items of management information about the albums stored in the song file storage section 123. The album IDs are unique to the albums that are stored in the song file storage section 123. The song IDs of the songs included in the albums correspond to the song IDs shown in FIG. 3A.

How albums, songs, and song files are related to one another will now be described with reference to FIG. 4. Each album is established illustratively as a collection of songs performed by one artist. However, this definition of the album is not limitative of the invention. Alternatively, an album may be constituted by a single song. Songs are established in child relation to albums. Each song is stored as a single data file in the song file storage section 123 shown in FIG. 2, the file being prepared in any one of diverse data formats (e.g., OMG, MP3, WMA).

The items in the column "ID" in the management information tables of FIGS. 3A and 3B about albums and songs are identifiers that identify these albums and songs. Where songs are contained in an album, the album is established as a parent and the songs are considered children. As shown in FIG. 3B, the management data in increments of albums includes album IDs as well as the song IDs of the songs included in each album. The correspondence between the stored IDs makes it possible to identify the album based on a given song or to find out the songs contained in a given album. Following a search for a song based on a song ID, a reference made to the album corresponding to that song ID reveals the album ID which leads to relevant album information.

The information stored in the license information storage section 121 will now be described. The license information storage section 121 accommodates license information about files based on, say, the SDMI (Secure Digital Music Initiative) standard.

Figure 5:
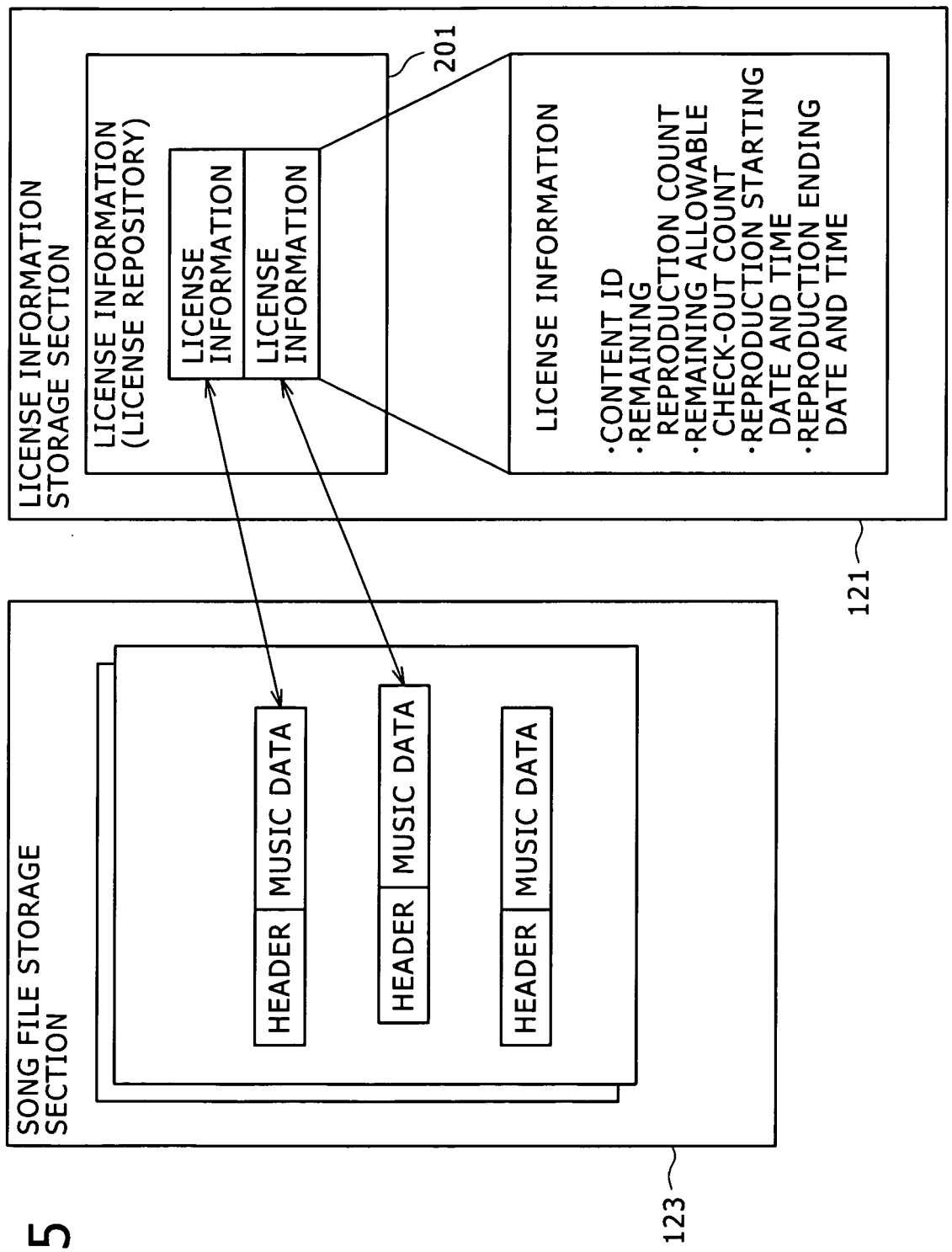
FIG. 5 is a schematic view showing how license information and song files are managed by the information processing apparatus of the invention.

What follows is a description, with reference to FIG. 5, of the information placed in the license information storage section 121. As shown in FIG. 5, license information 201 in the license information storage section 121 is established in association with the content files retained in the song file storage section 123. Each content file in the song file storage section 123 is made up of header information and music data as illustrated. The music data, as described above, is placed in the song file storage section 123 as data prepared in any one of diverse data formats (e.g., OMG, MP3, WMA).

The license information 201 corresponds to the contents (i.e., songs) stored in the song file storage section 123. Illustratively, the license information 201 is constituted by content IDs, remaining reproduction counts, remaining allowable check-out counts, reproduction starting dates and times, and reproduction ending dates and times.

Upon receipt of a song ID from the song management section 114, the license information storage section 121 searches for a single set of license information corresponding to the song ID in question. The retrieved license information is sent to the song management section 114. Based on the license information thus supplied, the song management section 114 controls content availability when the content of interest is to be reproduced by the content management processing section 112 or to be transferred by the content transfer processing section 113.

The song file storage section 123, as shown in FIG. 5, accommodates a large number of files in increments of songs in such data formats as MP3, ATRAC3, OMG, and WMA. The same songs may each be stored in different data formats.

Figure 4:
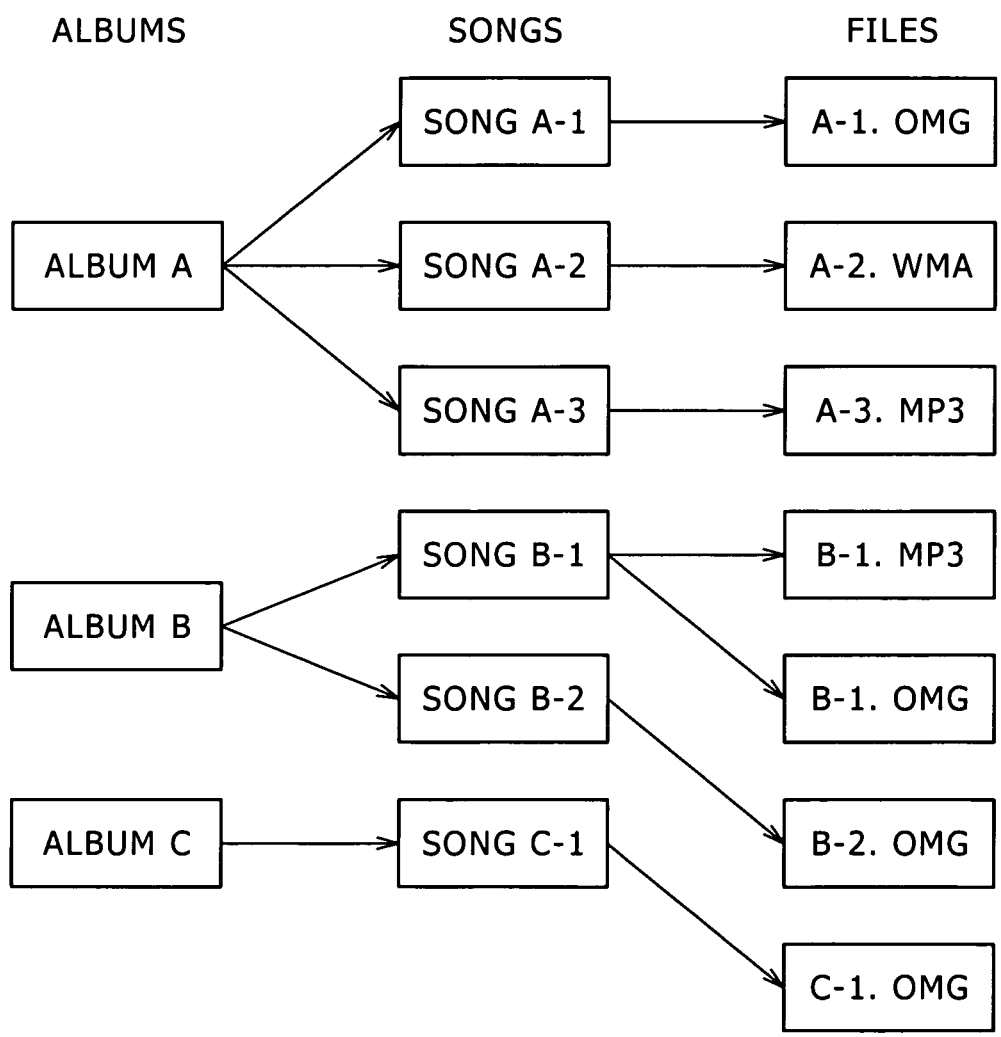
FIG. 4 is a schematic view showing how albums, songs, and song files are related to one another.

Illustratively, a song B-1 provided as a child of an album B in FIG. 4 is shown stored in the song file storage section 123 as two data files in two different data formats: a data file B-1.MP3 (an MP3 data file), and a data file B-1.OMG (an OMG data file).

The additional information storage section 124 retains additional data about the contents such as image data representing jackets, lyrics, and recording dates and times.

Figure 6:
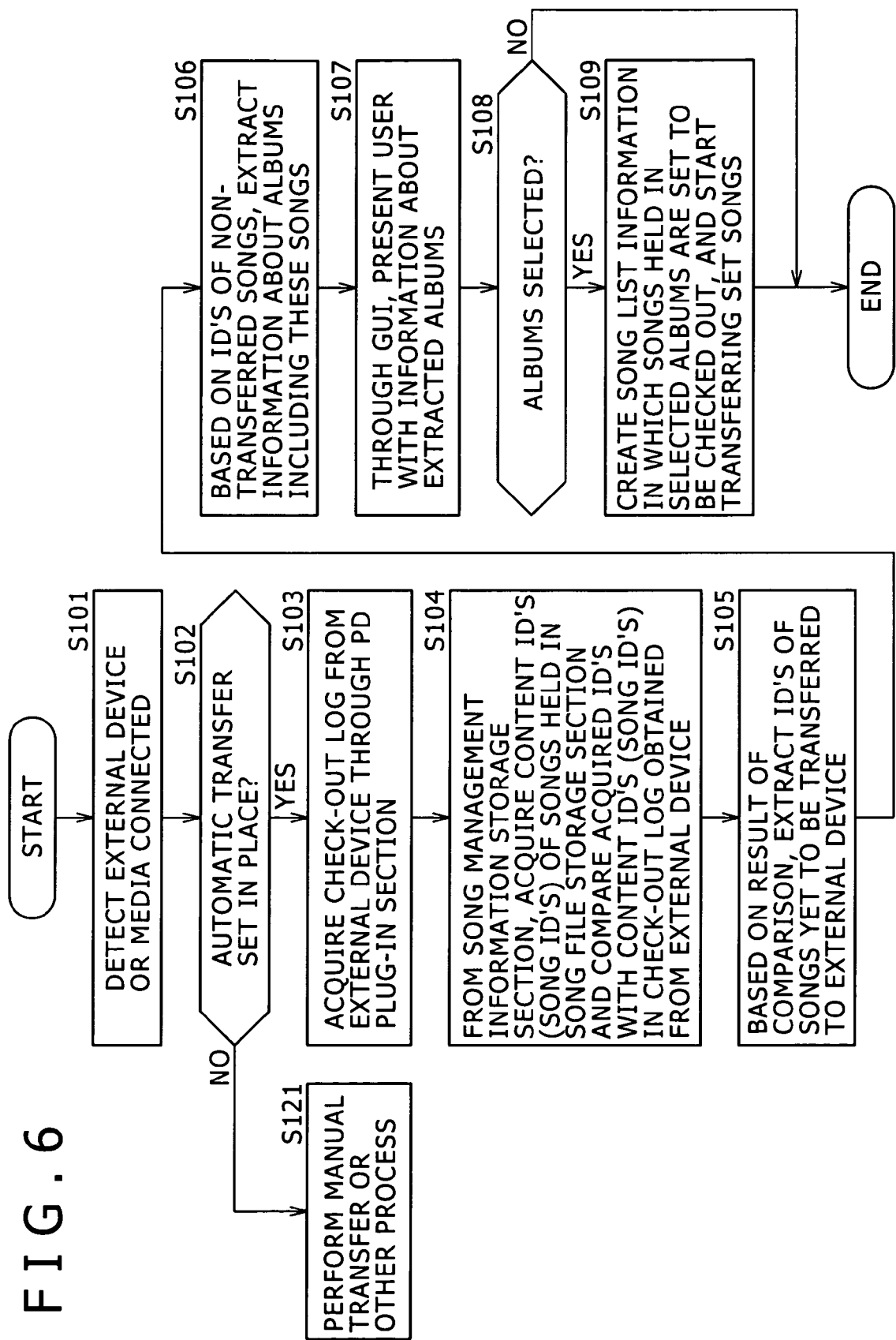
FIG. 6 is a flowchart of steps constituting a content transfer sequence performed by the information processing apparatus of the invention.

The process of transferring contents to the external device will now be described in detail. FIG. 6 is a flowchart of steps constituting a content transfer sequence performed by the information processing apparatus of the present invention.

The sequence is explained below by referring to the flowchart of FIG. 6.

When the external device such as a portable device or a piece of media such as a flash memory is connected to the PD plug-in section 117 of the information processing apparatus 100, the apparatus 100 detects in step S101 the connection of the external device or media.

When the external device or the piece of media is found connected, the content transfer processing section 113 acquires information about the connected device or media through the PD plug-in section 117. The information about the connected external device is displayed by way of the GUI section 111.

Figure 7:
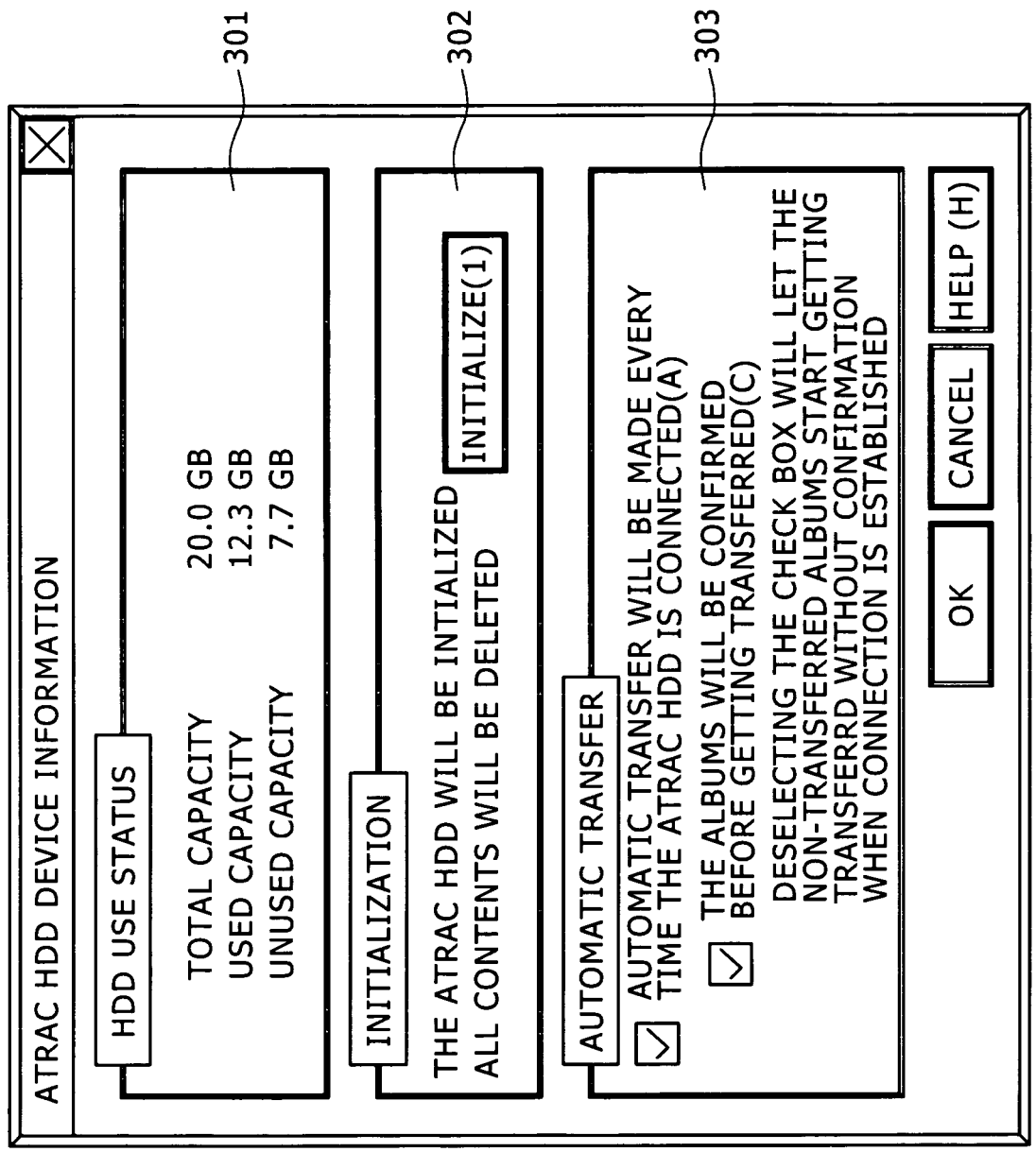
FIG. 7 is a schematic view showing external device information presented to a user through GUI when an external device is connected to the information processing apparatus of the invention.

Typical information about the connected external device is displayed as indicated in FIG. 7. The display in FIG. 7 illustratively shows items of external device information about an ATRAC HDD connected to the PD plug-in section 117. As illustrated, the connected external device information includes use status information 301 about the HDD acting as storing means of the external device, initialization information 302 about the HDD, and automatic transfer setting information 303 about the device.

The automatic transfer setting information 303 offers the user two options: whether or not to let automatic transfer be carried out whenever the external device in question is connected, and whether or not to confirm each album before it is automatically transferred.

The process of automatic transfer involves acquiring from the external device a check-out log including the content IDs (song IDs) of the contents already transferred to that device, comparing the check-out log with the management information held in the song management information storage section 122 to select non-transferred contents (i.e., contents not included in the check-out log), and transferring the non-transferred contents thus selected to the external device. If the automatic transfer setting is deselected, manual transfer is brought into effect. This setting requires the user manually to select desired contents to be transferred.

Even if the automatic transfer setting is being selected, an additional setting makes it possible to present the user with information about the albums containing the non-transferred songs through the GUI section 111 so that the user, on confirming the presented album information, may select desired songs to be transferred. This setting is selected or deselected by inserting or removing the check mark to or from the box indicating "THE ALBUMS WILL BE CONFIRMED BEFORE GETTING TRANSFERRED" in the automatic transfer setting information 303. Putting the check mark into this check box allows the user manually to select the songs to be transferred after confirming the presented album information. If the check mark is removed, then automatic transfer is set in place so that the contents not included in the check-out log of the external device (non-transferred songs) are selected and transferred to that device automatically. These settings are associated with the device ID of each external device and are stored as part of the management information in the memory of the content transfer processing section 113. Alternatively, the setting information may be retained in each external device and may be acquired from there every time the device in question is connected.

The description of the sequence for the content transfer process will now be resumed by referring again to the flowchart of FIG. 6. In step S102, the content transfer processing section 113 of the information processing apparatus 100 checks to determine whether automatic transfer is set for external device connected to the PD plug-in section 117. If automatic transfer is not set in place, step S121 is reached for manual transfer or for some other process.

Figure 8:
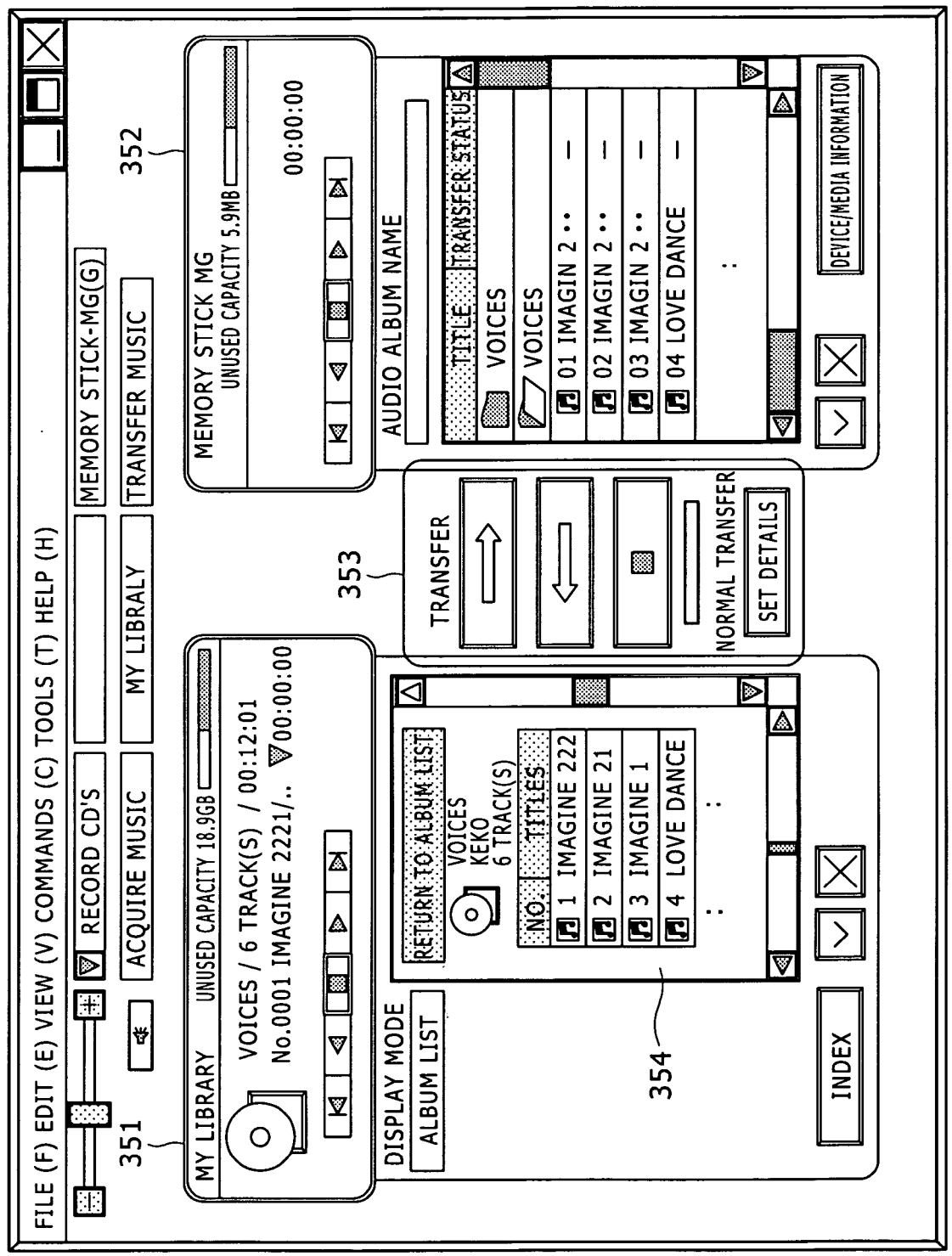
FIG. 8 is a schematic view showing a display screen presented when contents are transferred from the information processing apparatus of the invention to the external device.

If manual transfer is set in place, a transfer processing screen such as one shown in FIG. 8 is displayed through the GUI section 111. On the left-hand side of the transfer processing screen appears "My Library" information 351 including information about songs and albums stored in the information processing apparatus 110; on the right is external device information 352 made up of information about the songs previously or currently transferred to the external device.

The user selects desired albums to be transferred illustratively from album information 354 displayed as part of the My Library information 351. The selected albums are transferred by operating transfer control buttons 353 in the middle of the screen.

Where automatic transfer is set in place, step S103 is reached. In step S103, the information processing apparatus 100 acquires from the external device a check-out log including the content IDs (song IDs) of previously transferred contents.

FIG. 9 shows typical data in the check-out log acquired from the external device. As shown in FIG. 9, the check-out log includes the name of the external device being connected, an applicable media ID, and transferred song log information (a list of the IDs of transferred songs). These items of information are held in a memory of the external device.

The transferred song log information (i.e., transferred song ID list) is a list of the IDs identifying the songs that were transferred in the past from the information processing apparatus 100 to the external device in question.

Alternatively, the check-out log may be kept in the memory of the information processing apparatus 100. Only the device ID may be acquired from the external device when it is connected. Based on the external device ID thus acquired, check-out log entries corresponding to the connected external device may be extracted from the check-out log in the memory. The check-out log thus extracted may then be compared with the content IDs constituting the stored content information in the data storage block, whereby non-transferred contents may be determined.

The information processing apparatus acquires the check-out log such as the one shown in FIG. 9 or the device ID from the external device in step S103. Check-out log entries corresponding to the connected external device are then extracted from the check-out log stored into the information processing apparatus. In step S104, the information processing apparatus acquires from the song management information storage section 122 the content IDs (song IDs) of the songs stored in the song file storage section 123, and compares the acquired IDs with the content IDs (song IDs) recorded in the check-out log.

In step S105, the information processing apparatus extracts the IDs of the songs yet to be transferred to the external device on the basis of the comparison performed in step S104. What is extracted here are the song IDs which are included in the content IDs (song IDs) of the songs stored in the song file storage section 123 but which are not included in the content IDs (song IDs) recorded in the check-out log.

In step S106, the information processing apparatus extracts information about the albums including the non-transferred songs based on the non-transferred song IDs extracted in step S105. The album information is extracted by use of the album-by-album management information held in the song management information storage section 122 as explained above with reference to FIGS. 3A and 3B. As illustrated, the management information in increments of albums has the song IDs corresponding to each album. What is selected here on the basis of the album-by-album management information shown in FIG. 3B are the albums that include the song IDs extracted as representative of the non-transferred songs. The album information including the album names is extracted from the song management information storage section 122.

In step S107, the album information extracted in step S106 from the song management information storage section 122 regarding the albums that include the non-transferred songs is presented through the GUI section 111. The process of presenting the user with the information is effected only if the check box indicating "THE ALBUMS WILL BE CONFIRMED BEFORE GETTING TRANSFERRED" is selected as part of the automatic transfer setting information 303 about the external device being connected, as described above with reference to FIG. 7. If the check box is deselected, then the contents not included in the check-out log of the external device (i.e., non-selected songs) are selected and transferred to the external device automatically.

The description hereunder is based on the assumption that the check box indicating "THE ALBUMS WILL BE CONFIRMED BEFORE GETTING TRANSFERRED" is being selected. In step S107, through the GUI section 111, the user is presented with the album information extracted from the song management information storage section 122 regarding the albums that include the non-transferred songs.

Figure 10:
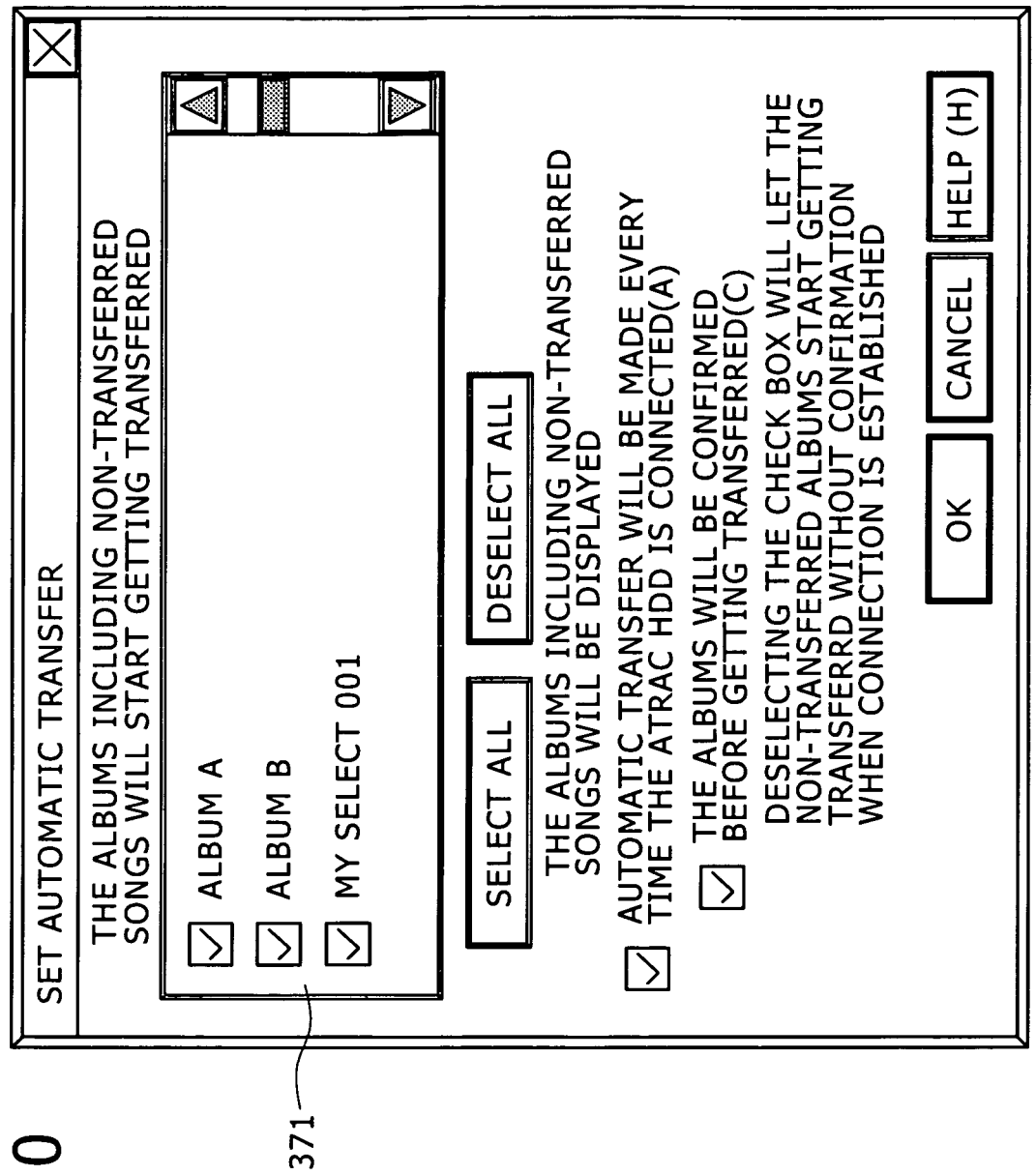
FIG. 10 is a schematic view of information about albums which include non-transferred songs and which are presented to the user through GUI when contents are to be transferred from the information processing apparatus of the invention to the external device.

FIG. 10 shows typical information presented to the user. As illustrated, the presented information includes an album list 371 indicating the albums containing non-transferred songs. The user may select desired albums to be transferred from the album list 371 thus presented.

If in step S108 the user selectively inputs the desired albums through the GUI section 111, step S109 is reached. In step S109, the information processing apparatus creates song list information in which the songs contained in the selected albums are set to be checked out. The apparatus then starts transferring the selected songs in accordance with the song list information.

According to the present invention, as described above, the information processing apparatus acquires a check-out log including transferred content IDs from the connected external device, compares the acquired check-out log with the stored content IDs constituting the stored content information in the data storage block so as to determine non-transferred contents, and establishes the non-transferred contents thus determined as the contents to be transferred to the external device. The inventive apparatus thus eliminates the need for the user manually to verify and distinguish already transferred contents from the contents yet to be transferred. This brings about an efficient content transfer process.

In the procedure for transferring contents to the external device described above with reference to FIG. 6, the extracted album information was shown to cover the albums each including at least one song yet to be transferred to the external device. The album information was then presented to the user via GUI to let the user select desired albums for transfer to the external device.

Figure 11:
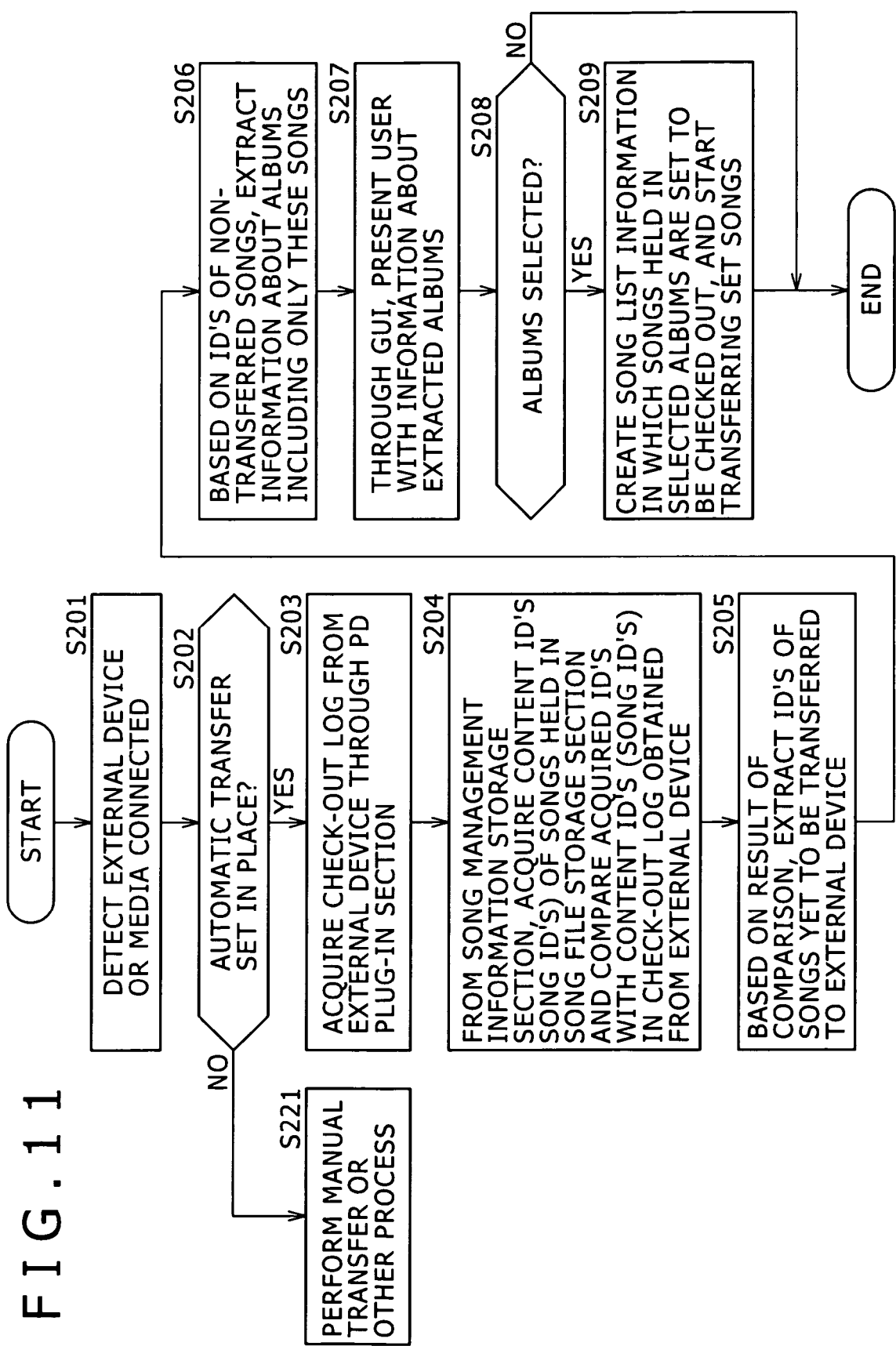
FIG. 11 is a flowchart of steps constituting a variation of the content transfer sequence performed by the information processing apparatus of the invention.

What follows is a description of one variation of the content transfer procedure whereby the albums containing only the songs yet to be transferred to the external device are extracted as a second embodiment. Information about the albums thus extracted is presented to the user for content transfer. This variation of the content transfer procedure according to the invention will now be described by referring to the flowchart of FIG. 11.

In step S201, a check is made to determine whether the external device such as a portable device or a piece of media such as a flash memory is connected to the PD plug-in section 117 of the information processing apparatus 100.

When the external device or piece of media is found connected, the content transfer processing section 113 acquires information regarding the connected external device from that device through the PD plug-in section 117. The acquired information about the connected external device is displayed via the GUI section 111. In this step, as described above with reference to the flowchart of FIG. 6, the connected external device information such as the one shown in FIG. 7 is displayed. FIG. 7 shows an example of the connected external device information in effect when an external device ATRAC HDD is connected to the PD plug-in section 117. As shown in FIG. 7, the connected external device information includes use status information 301 about the HDD serving as the storing means of the external device, initialization information 302 about the HDD, and automatic transfer setting information 303 about the device.

Where this variation of the automatic transfer procedure is in use, enabling automatic transfer causes the information about the albums containing only non-transferred songs to be presented to the user via the GUI section 111. The user may select desired songs to be transferred by verifying the presented album information. The automatic transfer setting is selected or deselected by inserting or removing the check mark to or from the check box indicating "THE ALBUMS WILL BE CONFIRMED BEFORE GETTING TRANSFERRED" in the automatic transfer setting information 303. Putting the check mark into this check box allows the user manually to select the songs to be transferred after confirming the presented album information.

In step S202, the content transfer processing section 113 of the information processing apparatus 100 checks to determine whether automatic transfer is set for the external device connected to the PD plug-in section 117. If automatic transfer is not set in place, step S221 is reached for manual transfer or for some other process.

If manual transfer is to be carried out, the transfer processing screen such as the one in FIG. 8 is displayed through the GUI section 111 as described above with reference to the flowchart of FIG. 6. The user selects desired albums to be transferred illustratively from the album information 354 displayed as part of the My Library information 351. The selected albums are transferred by operating the transfer control buttons 353 in the middle of the screen.

Where automatic transfer is set in place, step S203 is reached. In step S203, the information processing apparatus 100 acquires from the external device a check-out log (see FIG. 9) including the content IDs (song IDs) of previously transferred contents.

The information processing apparatus acquires the check-out log such as the one shown in FIG. 9 or the device ID from the external device in step S203. Check-out log entries corresponding to the connected external device are then extracted from the check-out logs kept in the information processing apparatus. In step S204, the content IDs (song IDs) of the songs stored in the song file storage section 123 are acquired from the song management information storage section 122 and compared with the content IDs (song IDs) recorded in the check-out log.

In step S205, the IDs of the songs yet to be transferred to the external device are extracted on the basis of the comparison carried out in step S205. What is extracted here are the IDs of the non-transferred songs, i.e., IDs which are included in the content IDs (song IDs) of the songs stored in the song file storage section 123 but which are not included in the content IDs (song IDs) recorded in the check-out log.

In step S206, the information processing apparatus extracts information about the albums containing only the non-transferred songs based on the non-transferred song IDs extracted in step S205.

In the procedure described above with reference to FIG. 6, the information about the albums each including at least one non-transferred song was shown extracted on the basis of the non-transferred song IDs. In this example, by contrast, the information about the albums each containing only the non-transferred song or songs is extracted based on the non-transferred song IDs.

The album information is extracted by use of the album-by-album management information held in the song management information storage section 122 as explained above with reference to FIGS. 3A and 3B. As illustrated, the management information in increments of albums has the song IDs corresponding to each album. What is selected here on the basis of the album-by-album management information shown in FIG. 3B are the albums that contain only the song IDs extracted as representative of the non-transferred songs. The album information including the album names is extracted from the song management information storage section 122.

In step S207, the album information extracted in step S206 from the song management information storage section 122 regarding the albums each containing only the non-transferred songs is presented through the GUI section 111. The process of presenting the user with the information is effected only if the check box indicating "THE ALBUMS WILL BE CONFIRMED BEFORE GETTING TRANSFERRED" is selected as part of the automatic transfer setting information 303 about the external device being connected, as described above with reference to FIG. 7. If the check box is deselected, then the contents not included in the check-out log of the external device (i.e., non-selected songs) are selected and transferred to the external device automatically.

The description that follows is based on the assumption that the check box indicating "THE ALBUMS WILL BE CONFIRMED BEFORE GETTING TRANSFERRED" is being selected. In step S207, through the GUI section 111, the user is presented with the album information extracted from the song management information storage section 122 regarding the albums containing only the non-transferred songs.

Figure 12:
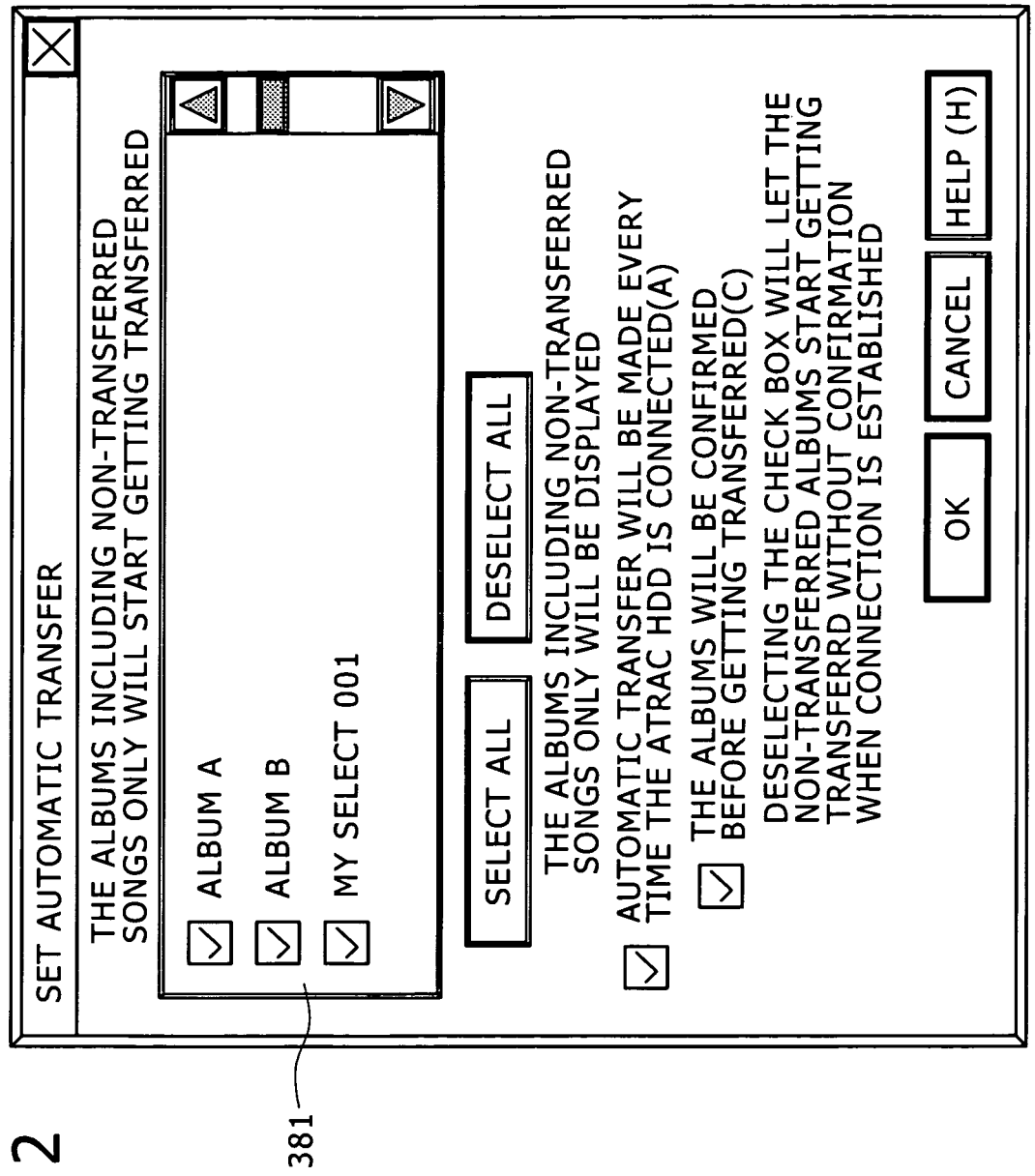
FIG. 12 is a schematic view of information about albums which have non-transferred songs and which are presented to the user through GUI when contents are to be transferred from the information processing apparatus of the invention to the external device.

FIG. 12 shows typical information presented to the user. As illustrated, the presented information includes an album list 381 indicating albums that contain only non-transferred songs. The user may select desired albums to be transferred from the album list 381 thus presented.

If in step S208 the user selectively inputs the desired albums through the GUI section 111, step S209 is reached. In step S209, the information processing apparatus creates song list information in which the songs constituting the selected albums are set to be checked out. The apparatus then starts transferring the selected songs in accordance with the song list information.

According to the present invention, as described above, the information processing apparatus acquires a check-out log including transferred content IDs from the connected external device, compares the acquired check-out log with the stored content IDs constituting the stored content information in the data storage block so as to determine non-transferred contents, and establishes the non-transferred contents thus determined as the contents to be transferred to the external device. The albums each containing only non-transferred contents are established as candidate albums that may be transferred selectively. The inventive apparatus thus eliminates the need for the user manually to verify and distinguish already transferred contents from the contents yet to be transferred. This brings about an efficient content transfer process.

A typical hardware structure of the information processing apparatus for carrying out the above-described procedures will now be described with reference to FIG. 13.

A CPU (central processing unit) 501 is a control unit that performs processes in keeping with various computer programs including a content recording/reproduction processing program, a content download processing program, and a content transfer processing program under control of an OS (operating system).

A ROM (read only memory) 502 stores the programs and parameters for use by the CPU 501. A RAM (random access memory) 503 accommodates the programs being executed by the CPU 501 as well as the parameters that vary during execution of the programs. These component parts are interconnected by a host bus 504 illustratively formed by a CPU bus.

The host bus 504 is connected to an external bus 506 such as a PCI (Peripheral Component interconnect/Interface) bus through a bridge 505.

A keyboard 508 is operated by the user in inputting commands to the CPU 501. A pointing device 509 is manipulated by the user in pointing to and selecting items on the screen of a display device 510. The display device 510 is constituted illustratively by a liquid crystal display device or a CRT (cathode ray tube) that displays diverse kinds of information in text or in image form. An HDD (hard disk drive) 511 drives a hard disk to record and reproduce programs and information on which the CPU 501 operates.

A drive 512 is loaded with a removal recording medium 521 such as a magnetic disk, an optical disk, a magneto-optical disk, or a semiconductor memory carrying data or programs. The drive 512 reads data and programs from the loaded medium and supplies what is retrieved to the RAM 503 via an interface 507, the external bus 506, bridge 505, and host bus 504.

A connection port 514 with its connective arrangements based on the USB, IEEE1394 or other suitable standards is used to connect an externally connected device 522 such as a player. The connection port 514 is connected the CPU 501 and other component parts through the interface 507, external bus 506, bridge 505, and host bus 504.

A communication device 515 connected to a network handles transmission of data from the CPU 501, HDD 511, or other internal components to servers or the like on the network as well as the reception of data in the opposite direction. Illustratively, the communication device 515 conducts communications in acquiring contents and content-related information.

It is to be understood that while the invention has been described in conjunction with specific embodiments with reference to the accompanying drawings, it is evident that many alternatives, modifications and variations will become apparent to those skilled in the art in light of the foregoing description. It is thus intended that the present invention embrace all such alternatives, modifications and variations as fall within the spirit and scope of the appended claims.

The series of steps or processes described above may be executed either by hardware, by software, or by the combination of both. For the software-based processing to take place, the programs constituting relevant processing sequences may be either incorporated beforehand in dedicated hardware of a computer or installed upon use into a general-purpose personal computer or like equipment capable of executing diverse functions based on the installed programs.

Illustratively, the programs above are recorded beforehand on a recording medium such as a hard disk or a ROM (read only memory). Alternatively, the programs may be stored (i.e., recorded) temporarily or permanently on such removable recording media as flexible disks, CD-ROMs (compact disc-read only memories), MOs (magneto-optical disks), DVDs (digital versatile discs), magnetic disks, or semiconductor memories. These removable recording media may be offered as so-called packaged software.

Besides being installed from such removable recording media into the computer, the programs may be transferred from appropriate download sites to the computer wirelessly or in wired fashion over a LAN (local area network) or the Internet. The transferred programs upon receipt are installed onto an internal recording medium of the computer such as a hard disk.

The steps or processes described in this specification may or may not be carried out solely in the depicted sequence (i.e., on a time series basis); the steps or process may also be executed parallelly or individually as needed or in keeping with the performance of the apparatus doing the execution. In this specification, the term "system" refers to a logical configuration of a plurality of component devices. Each of the devices may or may not be housed in a single enclosure.

INDUSTRIAL APPLICABILITY

According to the present invention described above, when the contents stored in and managed by the information processing apparatus are to be transferred to an external device, a check-out log is acquired from the external device as information including the content IDs about the contents already transferred to the device. The content IDs in the check-out log are compared with the content IDs acquired from the song management information storage section in the information processing apparatus with regard to the contents stored in the apparatus, whereby non-transferred contents are selected and transferred to the external device. The inventive arrangements eliminate the need for the user to confirm already transferred contents in order to select the contents to be transferred, thus making the transfer of contents more efficient than before.

Furthermore, according to the present invention, even when automatic transfer is set in place, the user is still presented through GUI with either a list of albums including non-transferred songs or a list of albums having only non-transferred songs so that the user may select desired albums from which to transfer the songs. The user's chores are thus reduced by the automatic selection and transfer of non-transferred songs, and the user's preferences are taken into account in transferring the contents.

The invention claimed is:

1. An information-processing apparatus, comprising:
a networking device that communicates with an external apparatus;
a storage that stores a plurality of albums each including a plurality of content data and a transfer log indicating whether each of the plurality of content data has been transferred to the external apparatus; and
a processing unit configured to identify certain content data from the plurality of content data of each album when the transfer log indicates that the certain content data has never been transferred to the external apparatus,
the processing unit further configured to control a display of information about each album in response to a determination of each album based on the certain content data that has never been transferred to the external apparatus, the display of information including a list of names of each album including at least one of the certain content data,
the processing unit further configured to start a transfer of only data of the certain content data in individually selected albums to the external apparatus, upon a selection in response to the display of the information about the plurality of albums, the response including the individually selected albums based on the list of the names of each album including at least one of the certain content data,
the processing unit further configured to update the transfer log when the networking device transfers the certain content data to the external apparatus.

2. The information-processing apparatus according to claim 1, wherein, when the networking device receives a device ID from the external apparatus, and the processing unit identifies the transfer log based on the device ID.

3. The information-processing apparatus according to claim 1, wherein the processing unit is further configured to acquire the transfer log from the external apparatus.

4. The information-processing apparatus according to claim 1, wherein the certain content data is defined by a song.

5. The information-processing apparatus according to claim 1, wherein the networking device receives a device ID of the external apparatus from the external apparatus, and the processing unit identifies the certain content data based on the device ID.

6. An information-processing apparatus, comprising:
means for communicating with an external apparatus;
means for storing a plurality of albums each including a plurality of content data and a transfer log indicating whether each of the plurality of content data has been transferred to the external apparatus; and
processing means for identifying certain content data from the plurality of content data of each album when the transfer log indicates that the certain content data has never been transferred to the external apparatus,
the processing means controlling a display of information about each album in response to a determination of each album based on the certain content data that has never been transferred to the external apparatus, the display of information including a list of names of each album including at least one of the certain content data,
the processing means starting a transfer of only data of the certain content data in individually selected albums to the external apparatus, upon a selection in response to the display of the information about the plurality of albums, the response including the individually selected albums based on the list of the names of each album including at least one of the certain content data,
the processing means updating the transfer log when the means for communicating transfers the certain content data to the external apparatus.

7. A non-transitory computer-readable medium encoded with computer executable instructions, wherein the instructions, when executed by a processing unit, cause the processing unit to:
store a transfer log indicating whether each of a plurality of content data in each of a plurality of albums has been transferred to an external apparatus;
identify certain content data from the plurality of content data of each album when the transfer log indicates that the certain content data has never been transferred to the external apparatus;
control a display of information about each album in response to a determination of each album based on the certain content data that has never been transferred to the external apparatus, the display of information including a list of names of each album including at least one of the certain content data;
start a transfer of only individually selected albums to the external apparatus, upon a selection in response to the display of the information about the plurality of albums, the response including the individually selected albums based on the list of the certain content data; and
update the transfer log in response to a transfer of the certain content data to the external apparatus.

8. The computer-readable medium according to claim 7, wherein, after a reception of a device ID from the external apparatus, the processing unit identifies the transfer log based on the device ID.

9. The computer-readable medium according to claim 7, wherein the instructions further cause the processing unit to acquire the transfer log from the external apparatus.

10. The computer-readable medium according to claim 7, wherein the certain content data is defined by a song.

* * * * *